United States Patent [19]
Velayutha et al.

[11] Patent Number: 5,794,740
[45] Date of Patent: Aug. 18, 1998

[54] DUAL TYPE COMPOSITION BRAKE BLOCK SPECIFICALLY DESIGNED FOR USE IN PREDETERMINED TYPE BRAKE SYSTEMS

[75] Inventors: Raj Velayutha; John R. Travers, both of Kurrajong, Australia

[73] Assignee: Westinghouse Air Brake Company, Wilmerding, Pa.

[21] Appl. No.: 709,197

[22] Filed: Aug. 23, 1996

[51] Int. Cl.$^6$ ............................................. F16D 69/00
[52] U.S. Cl. .................... 188/251 A; 188/250 B; 188/73.1
[58] Field of Search .................. 188/251 A, 251 R, 188/256, 257, 250 R, 250 B, 251 M, 73.1, 250 G

[56] References Cited

U.S. PATENT DOCUMENTS

| | | | |
|---|---|---|---|
| 3,410,374 | 11/1968 | Haupt | 188/251 A X |
| 4,781,275 | 11/1988 | Olsen | 188/251 A |
| 4,926,978 | 5/1990 | Shibata et al. | 188/251 A X |
| 5,474,159 | 12/1995 | Soennecken et al. | 188/251 A |

FOREIGN PATENT DOCUMENTS

| | | | |
|---|---|---|---|
| 635025 | 2/1956 | Canada | 188/251 A |
| 1143992 | 2/1969 | United Kingdom | 188/251 A |

*Primary Examiner*—Peter M. Poon
*Attorney, Agent, or Firm*—James Ray & Associates

[57] ABSTRACT

A dual type composition brake block member specifically designed for use in predetermined type brake systems. The brake block member consists of a brake surface having a predetermined configuration and a predetermined surface area. It further includes a first low friction type composition material having a predetermined friction range and extends over a first predetermined portion of the surface area of the brake surface. It further includes a second high static friction type composition material having a second predetermined friction range. The second high static friction type composition material extends over a second portion of the surface area of the brake surface. One of such first low friction type composition material and such second high static friction type composition material being formed as a discrete insert type member and the opposite one of such first low friction type composition material and such second high static friction type composition material being formed around the insert of such first low friction type composition material and such second high static friction type composition material during production of the brake block member. Such one of such first low friction type composition material and such second high static friction type composition material being formed as the discrete insert member extends into such opposite one of such first low friction type composition material and such second high static friction type composition material to a predetermined depth of the brake block member.

18 Claims, 2 Drawing Sheets

DUAL TYPE COMPOSITION BRAKE BLOCK SPECIFICALLY DESIGNED FOR USE IN PREDETERMINED TYPE BRAKE SYSTEMS

FIELD OF THE INVENTION

The present invention relates, in general, to railway vehicle type brake vehicle type braking equipment and, more particularly, this invention relates to a composition type brake block member for use in a railway type vehicle brake system and, even still more specifically, the invention relates to an improved brake block member of a dual type composition that will provide a brake surface area having both a relatively static high friction and good wet friction surface in a relatively low friction surface in order to at least achieve sufficient braking while simultaneously substantially minimizing the undesirable noise levels that normally occurs during a brake application on such railway type vehicle.

BACKGROUND OF THE INVENTION

Prior to the conception and subsequent development of this invention, it is generally well known in the art to use various type brake shoes having different compositions to achieve quite specific braking requirements. For example, these compositions may include cast iron and various other type friction materials that are specifically formulated for a number of predetermined applications.

It is further well recognized, in the brake shoe art, that these various types of friction material will normally exhibit a number of uniquely different friction characteristics. Such friction characteristics, for example, include both high friction material and low friction material. Obviously, these different friction characteristics can have a significant effect on the distance that will be required to bring a railway type vehicle to a complete stop. Additionally, this stopping distance can be greatly affected by the various weather conditions that are normally encountered by the railway vehicle during operation, for example, wet or dry.

In many of the developed countries of the world there are certain critical requirements which are imposed on the stopping distance for a railway type vehicle. Such stopping distance imposed is obviously for safety reasons. Additionally, this stopping distance imposed must be capable of being achieved even in rather adverse weather conditions. For example, one of these critical requirements is that a train must possess the capability of being stopped even in wet conditions within about 15% of the normal stopping distance that would be achieved during operation in dry conditions. This particular requirement can generally be readily achieved through the use of a cast iron type brake shoe which will exhibit relatively low friction at normal operating speed and relatively high friction at low speed and in a static condition.

However, as is generally well known in the art, these cast iron brake shoes will normally generate a considerable amount of undesirable noise and dust during a brake application of a railway type vehicle. Consequently, as the population centers have expanded and people have moved nearer to the railroad track structures, this undesirable noise and dust has become a source of considerable concern to those persons who are located adjacent such track structures.

It is generally believed, by those persons who are skilled in the relevant railway vehicle braking art, that one means that could likely be utilized effectively to significantly reduce this undesirable noise to a generally more acceptable level would be to use a lower type friction composition in the manufacture of the brake shoes. However, prior to the development of the present invention, none of these lower friction composition materials has been able to achieve the stopping distance requirements, as were discussed above, which are imposed in adverse wet conditions. On the other hand, the present invention provides a brake shoe which gives the desired high static and low speed friction while maintaining the desired low friction at running speeds.

SUMMARY OF THE INVENTION

The present invention provides an improved brake shoe composite which possesses the capability of both reducing unwanted noise while simultaneously maintaining the required stopping distance in rather adverse wet conditions and the desirable high level of static friction which reduces the ability for a stationary train to run away on a gradient. The present invention provides a dual type composition brake block member specifically designed for use in predetermined type brake systems. Such brake block member comprises a brake surface having a predetermined configuration and a predetermined surface area. There is a first low friction type composition material provided in the brake block which has a first predetermined friction range. Such first low friction type composition material extends over a first predetermined portion of the predetermined surface area of the brake surface. Also included in the brake block member, of the present invention, is a second high friction and more abrasive type composition material which has a second predetermined friction range and level of abrasiveness. This second high friction type composition material extends over a second predetermined portion of the predetermined surface area of the brake surface. According to the invention, one of such first low friction type composition material and such second high friction type composition material will be formed as an at least one discrete insert type member and an opposite one of such first low friction type composition material and such second high friction type composition material is formed around such one of such first low friction type composition material and such second high friction type composition material during production of the brake block member. Such one of such first low friction type composition material and such second high friction type composition material being formed as at least one discrete insert member extending into the opposite one of such first low friction type composition material and such second high friction type composition material at least for a predetermined depth of the brake block member.

OBJECTS OF THE INVENTION

It is, therefore, one of the primary objects of the present invention to provide a brake block member of a dual type composition which can be specifically designed for effective use in predetermined type brake systems.

Another object of the present invention is to provide a brake block member of a dual type composition which when used in the manufacture of a railway vehicle type brake shoe will provide the capability of achieving the required stopping distance even in rather adverse weather conditions.

A further object of the present invention is to provide a brake block member of a dual type composition which when used in the manufacture of a railway vehicle type brake shoe will reduce undesirable noise and dust to an acceptable level during a brake application.

Still yet another object of the present invention is to provide a brake block member of a dual type composition which can be readily designed to meet specific performance requirements that may be imposed.

An additional object of the present invention is to provide a brake block member of a dual type composition which may include an abrasive type material incorporated therein to recondition a surface in frictional engagement with such brake block member during a brake application in order to provide an acceptable level of adhesion.

A further object of the present invention is to provide a brake block member of a dual type composition which when used in the manufacture of a railway vehicle type brake shoe will increase the level of static friction.

In addition to the various objects and advantages of the present invention which have been described in some specific detail above, various additional objects and advantages of the invention will become much more readily apparent to those persons who are particularly skilled in the relevant brake shoe friction art from the more detailed description of such invention, particularly, when such detailed description is taken in conjunction with the attached drawing Figures and with the appended claims.

Figure 1:
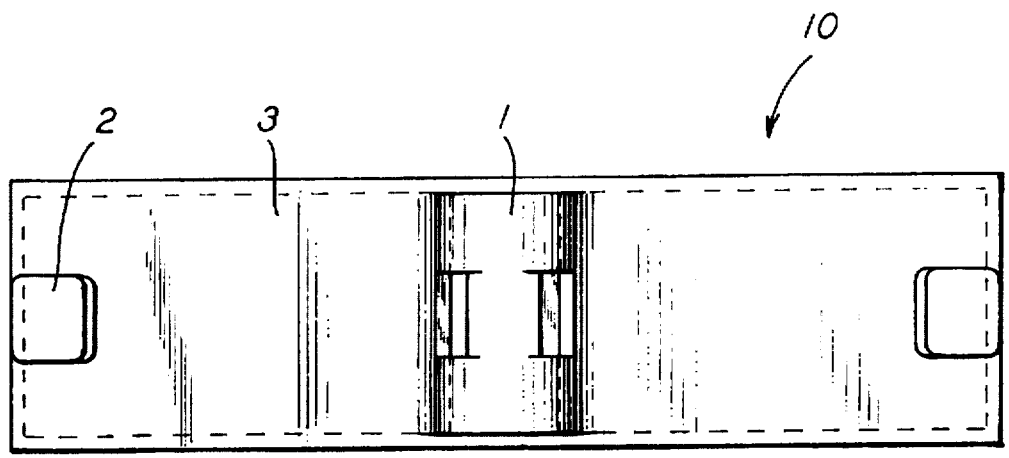
FIG. 1 is a plan view of the front portion of a dual type composition brake block member produced according to a presently preferred embodiment of the invention.

BRIEF DESCRIPTION OF THE PRESENTLY PREFERRED AND VARIOUS ALTERNATIVE EMBODIMENTS OF THE INVENTION

Prior to proceeding to the more detailed description of the various embodiments of the present invention, it should be noted that, for both the sake of clarity and understanding of the improved dual type composition brake block member according to the present invention, identical components which have identical functions have been identified with identical reference numerals throughout the several views which have been illustrated in the attached drawing Figures.

Reference is now made more particularly to the drawing FIGS. 1–4. Illustrated therein is a dual type composition brake block member, generally designated 10, specifically designed for use in a predetermined type brake system.

As can be seen in FIG. 1, in the presently preferred embodiment of the invention, brake block member 10 includes a stirrup 1 connected to the backing plate 3 to which such brake block member 10 is secured. Brake block member 10 further includes an abutment portion 2 which engages a key member (not shown). The backing plate 3 and abutment portion 2 are used to position and attach such brake block member 10 to the brake head portion (not shown) of the predetermined brake system. In a presently preferred embodiment of the invention, such backing plate 3 is preformed metal.

Figure 2:
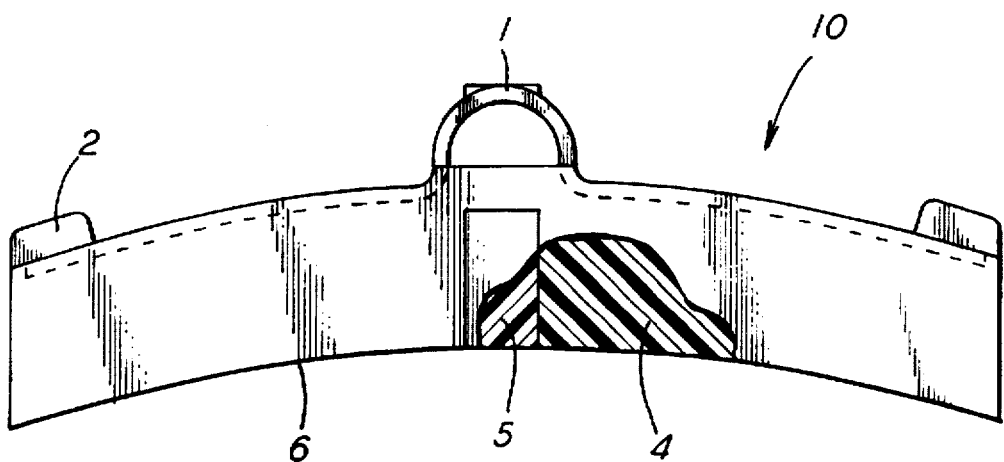
FIG. 2 is a side elevation view of the dual type composition brake block member illustrated in FIG. 1.

Reference is now made more specifically to FIG. 2, which illustrates a presently preferred embodiment of the invention. As shown therein, a first composition material 4 of the dual type brake block member 10 is a low friction type material which extends over a predetermined portion of the surface area of the brake surface 6. Such brake surface 6, when used in a railway braking system, will exhibit a generally arcuate shape. The low friction material preferably has a friction range generally between about 0.10μ and about 0.20μ. In a more preferred embodiment of the invention the low friction material has a friction range generally between about 0.14μ and about 0.18μ. The first composition material 4 will hereinafter be referred to as the parent material.

Such brake block member 10 further includes a second composition material 5, hereinafter referred to as an insert 5. In this embodiment such insert 5 is disposed substantially at a center position of such brake block member 10. The second composition material 5 also extends over a predetermined portion of the surface area of such brake surface 6. In this presently preferred embodiment of the invention, such second composition material 5 is a discrete high friction and high abrasive type material preferably having a friction range generally between about 0.30μ and about 0.50μ. In a more preferred embodiment of the present invention the high friction material has a friction range generally between about 0.35μ and about 0.40μ.

It should be noted that it is within the scope of the present invention for such parent composition material 4 to be a high friction type material with such discrete insert composition material 5 being a low friction material.

The discrete materials used are bonded together with predetermined resins to insure the final product is a solid single unit similar to a normal brake block. The different sections may or may not be visible to the naked eye. The surface area of each material in contact with the wheel will normally remain relatively constant throughout the life of the brake block, with maximum variations of up to 20%. It is presently preferred that such variations be controlled to within about 10%.

The depth of the inserted material is preferably the full depth of brake block 10, but such depth is at least down to the condemning point or substantially about 75% of the depth. The width of the inserted material 5 is preferably the full width of brake block 10. The length of the discrete insert 5 can vary from as little as 5% of the total contact length of brake block member 10 to as much as 95% of the length of such brake block member 10.

In a more preferred embodiment of the invention the length of the discrete insert 5 will generally be between about 10% and about 50% of the length of such brake block member 10.

Figure 3:
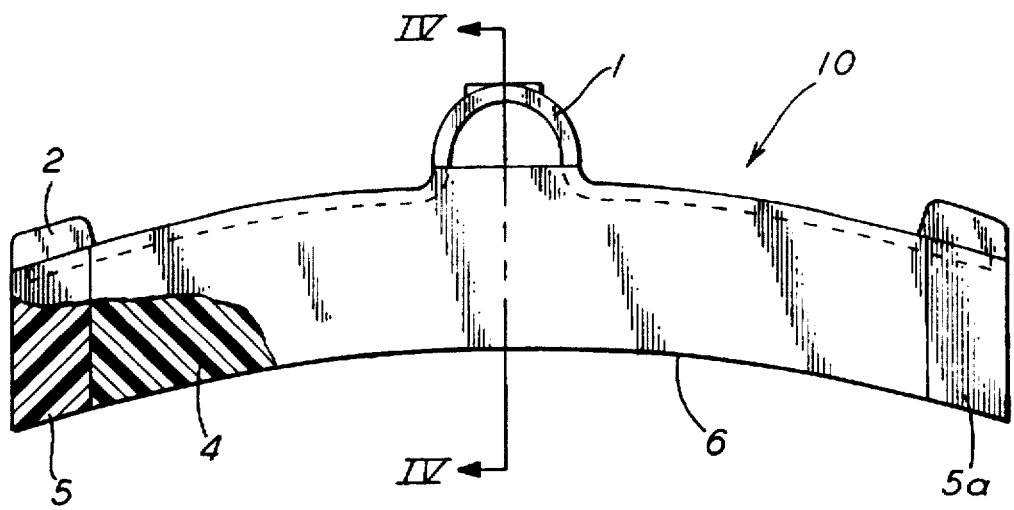
FIG. 3 is a side elevation view of a dual type composition brake block member which illustrates an alternate embodiment of the invention.
Figure 4:
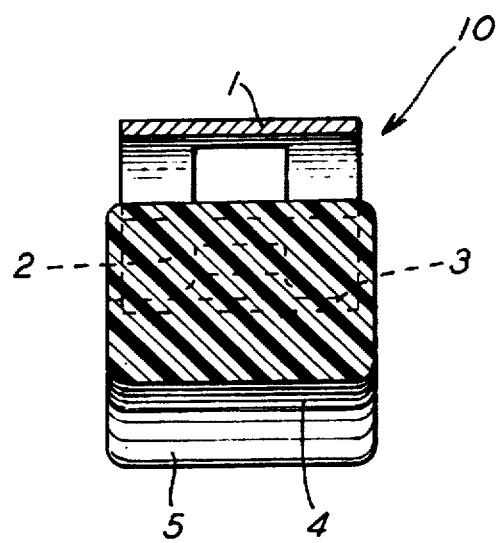
FIG. 4 is a cross-sectional view of the dual type composition brake block member taken along the lines of 1V—1V of FIG. 3.

Reference is now made, more particularly to FIG. 3. Illustrated therein is an alternate embodiment of the present invention wherein dual type brake block member 10 shows the parent material 4 with the insertion of two discrete inserts 5 and 5a disposed closely adjacent to each respective end of such brake block member 10. As with the embodiment previously described the depth of such inserts 5 and 5a is preferably the full depth of brake block member 10, but such depth will be at least down to the condemning point or substantially about 75% of such brake block member 10 and the width is preferably the full width of such brake block member 10.

The total length of such inserts 5 and 5a collectively can vary depending on the application. As in the first embodiment, the total length of the inserts 5 and 5a can vary from 5 to 95% of the length of such brake block member 10. In a more preferred embodiment of the invention the total length of such inserts 5 and 5a is generally between about 10% and about 50%.

The length and the specific friction characteristics of such insert material is determined by the requirements of the application. For example, the frictional formulations can be readily designed to meet frictional as well as other performance requirements. As requirements differ so do the formulations to match those requirements.

The present invention achieves particular performance criteria by the deliberate use of two or more discrete materials present in the same brake block member 10. By the selection of particular material types in a particular combination, a brake block member 10 is produced with unique performance characteristics that cannot be readily achieved by a single homogeneous material.

Although the present invention was primarily designed to replace cast iron and/or phosphorous cast iron brake blocks, it may be used for any application including the replacement of sintered metal blocks or when wet friction performance and high static friction is desired. It can also be used where the wheel condition needs to be improved. In this case, the discrete insert material 5 can be formulated to include a highly abrasive mix which delivers a controlled level of reconditioning of the wheel surface. Reconditioning, as used in the specification, includes but is not limited to removing micro surface cracking of the tread surface of the wheel, increasing surface roughness and improving wheel to rail adhesion.

These above examples are provided simply to illustrate the invention's applicability in various brake-related situations and are not to be taken as limitations.

While both the presently preferred and a number of alternative embodiments of the present invention have been described in detail above it is understood that various other adaptations and modifications of the present invention can be envisioned by those persons who are skilled the relevant art without departing from either the spirit of the invention or the scope of the appended claims.

We claim:

1. A dual type composition brake block member specifically designed for simultaneously reducing unwanted noise while maintaining required stopping distances in adverse wet conditions in railway vehicle brake systems, said brake block member comprising:

(a) a brake surface having a predetermined configuration and a predetermined surface area;
   (b) a first low friction type composition material having a first predetermined friction range, said first low friction type composition material extending over a first predetermined portion of said predetermined surface area of said brake surface, said first predetermined portion extending essentially a full width of said predetermined surface area of said brake surface;
   (c) a second high friction type composition material having a second predetermined friction range, said second high friction type composition material extending over a second predetermined portion of said predetermined surface area of said brake surface, said second predetermined portion extending essentially a full width of said predetermined surface area of said brake surface; and
   (d) one of said first low friction type composition material and said second high friction type composition material being formed as an at least one discrete insert type member and an opposite one of said first low friction type composition material and said second high friction type composition material being formed around said one of said first low friction type composition material and said second high friction type composition material during production of said brake block member, said one of said first low friction type composition material and said second high friction type composition material being formed as said at least one discrete insert member extends into said opposite one of said first low friction type composition material and said second high friction type composition material to a predetermined depth of said brake block member.

2. A dual type composition brake block member specifically designed for use in predetermined type brake systems, according to claim 1, wherein said predetermined configuration of said brake surface is generally arcuately shaped.

3. A dual type composition brake block member specifically designed for use in predetermined type brake systems, according to claim 1, wherein said first predetermined friction range of said first low friction type material is generally between about 0.10μ and about 0.20μ.

4. A dual type composition brake block member specifically designed for use in predetermined type brake systems, according to claim 3, wherein said first predetermined friction range of said first low friction type material is generally between about 0.14μ and about 0.18μ.

5. A dual type composition brake block member specifically designed for use in predetermined type brake systems, according to claim 3, wherein said second predetermined friction range of said second high friction type material is generally between about 0.30μ and about 0.50μ.

6. A dual type composition brake block member specifically designed for use in predetermined type brake systems, according to claim 5, wherein said second predetermined friction range of said second high friction type material is generally between about 0.35μ and about 0.40μ.

7. A dual type composition brake block member specifically designed for use in predetermined type brake systems, according to claim 1, wherein said first predetermined portion of said predetermined surface area of said brake surface is generally between about 5.0% and about 95.0%.

8. A dual type composition brake block member specifically designed for use in predetermined type brake systems, according to claim 7, wherein said first predetermined portion of said predetermined surface area of said brake surface is generally between about 50.0% and about 95.0%.

9. A dual type composition brake block member specifically designed for use in predetermined type brake systems, according to claim 1, wherein said predetermined depth of said one of said first low friction type composition material and said second high friction type composition material being formed as said at least one discrete insert type member extends into said opposite one of said first low friction type composition material and said second high friction type composition material is at least a depth at which said brake block member becomes condemned.

10. A dual type composition brake block member specifically designed for use in predetermined type brake systems, according to claim 9, wherein said predetermined depth of said one of said first low friction type composition material and said second high friction type composition material being formed as said at least one discrete insert type member extends into said opposite one of said first low friction type composition material and said second high friction type composition material for substantially a full depth of said brake block member.

11. A dual type composition brake block member specifically designed for use in predetermined type brake systems, according to claim 1, wherein a predetermined width of said one of said first low friction type composition material and said second high friction type composition material being formed as said at least one discrete insert type member is substantially identical to a predetermined width of said brake block member.

12. A dual type composition brake block member specifically designed for use in predetermined type brake systems, according to claim 1, wherein said predetermined type brake system is a railway vehicle brake system and said at least one discrete insert type member further includes a predetermined amount of a abrasive material to condition a wheel surface of such railway vehicle during a brake application.

13. A dual type composition brake block member specifically designed for use in predetermined type brake systems, according to claim 1, wherein said brake block member includes a single discrete insert type member disposed substantially at a center thereof.

14. A dual type composition brake block member specifically designed for use in predetermined type brake systems, according to claim 1, wherein said brake block member includes a pair of discrete insert type members, one each of said pair of discrete insert type members being disposed substantially closely adjacent a respective end thereof.

15. A dual type composition brake block member specifically designed for use in predetermined type brake systems, according to claim 1, wherein said one of said first low friction type composition material and said second high friction type composition material being formed as an at least one discrete insert type member is bonded together by a predetermined resin and an opposite one of said first low friction type composition material and said second high friction type composition material being formed around said one of said first low friction type composition material and said second high friction type composition material is bonded together by a predetermined resin during production of said brake block member such that said first low friction type composition material and said second high friction type composition material are bonded together with said predetermined resin.

16. A dual type composition brake block member specifically designed for use in predetermined type brake systems, according to claim 1, said predetermined surface area of said brake surface remains substantially constant throughout a useful life of said brake block member.

17. A dual type composition brake block member specifically designed for use in predetermined type brake systems, according to claim 16, wherein an amount of each material present in said first low friction type composition will remain substantially constant at said predetermined surface area of said brake block member throughout said useful life of said brake block member, unless deliberately designed to vary to achieve a specific design requirement.

18. A dual type composition brake block member specifically designed for use in predetermined type brake systems, according to claim 17, wherein an amount of each material present in said second high friction type composition will remain substantially constant at said predetermined surface area of said brake block member throughout said useful life of said brake block member.

* * * * *